UNITED STATES PATENT OFFICE.

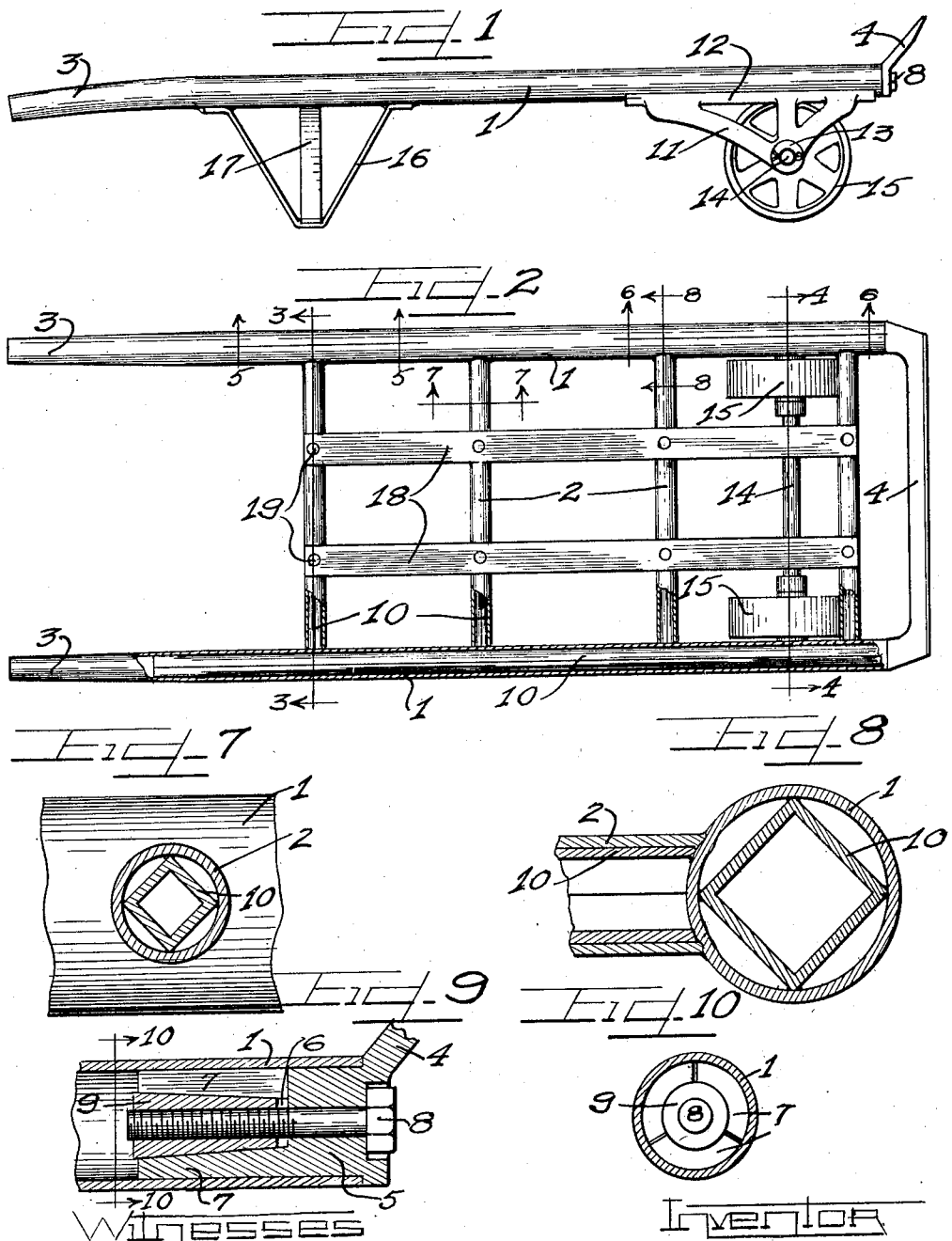

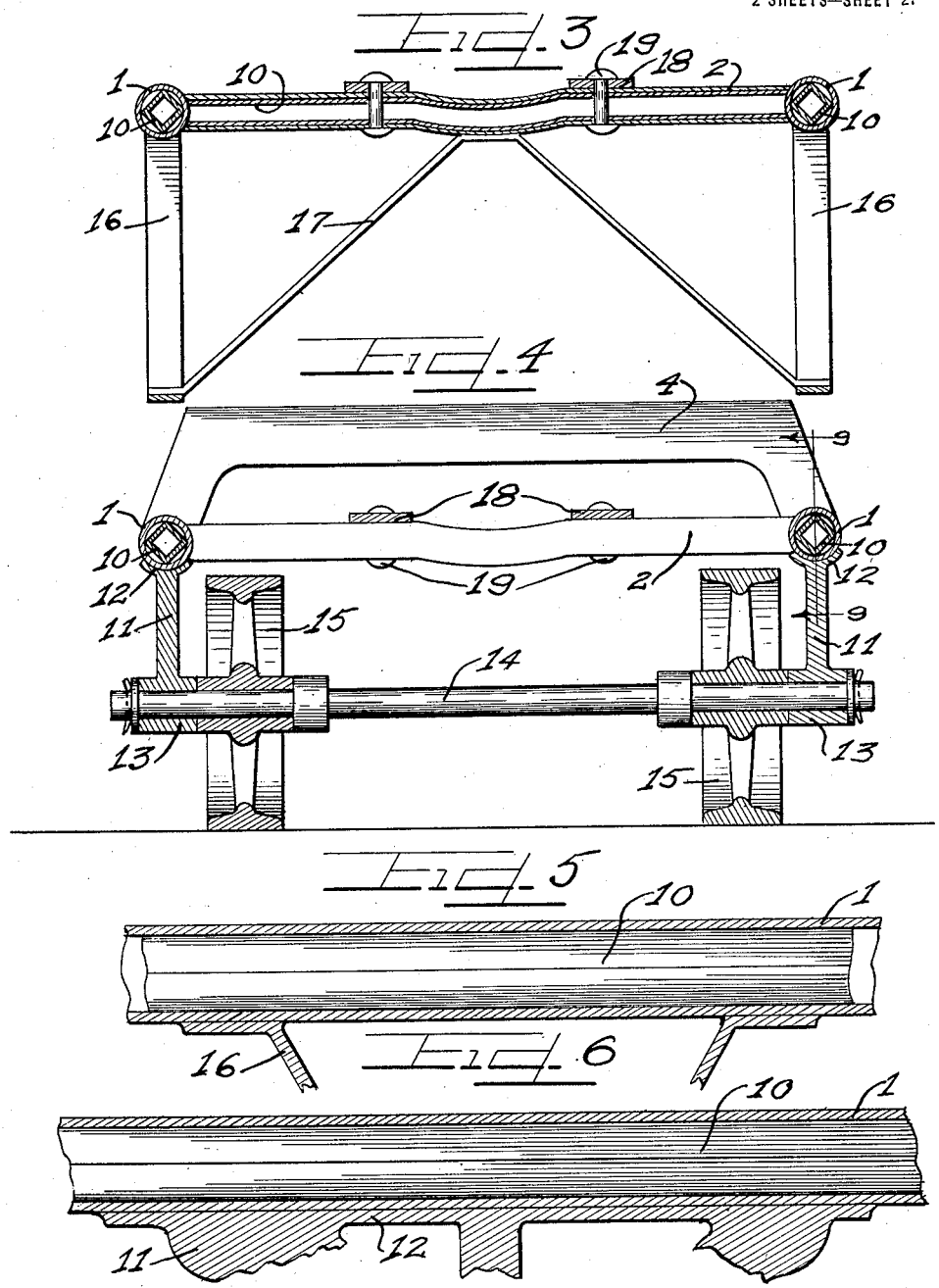

GUILFORD S. WOOD, OF CHICAGO, ILLINOIS.

REINFORCED TRUCK.

1,385,514.  Specification of Letters Patent.  Patented July 26, 1921.

Application filed June 13, 1918. Serial No. 239,710.

*To all whom it may concern:*

Be it known that I, GUILFORD S. WOOD, a citizen of the United States, and a resident of the city of Chicago, in the county of Cook and State of Illinois, have invented certain new and useful Improvements in Reinforced Trucks; and I do hereby declare that the following is a full, clear, and exact description of the same, reference being had to the accompanying drawings, and to the numerals of reference marked thereon, which form a part of this specification.

This invention relates to an improved form of a metal truck of comparatively light construction wherein the truck sills and the cross bars are electrically welded to one another and are reinforced by means of angular tubes disposed therein adapted to prevent bending of said sills and cross bars in all directions.

It is an object of this invention to construct a truck wherein the sills and cross members are reinforced against bending.

It is also an object of the invention to provide a metal truck wherein both the tubular sills and cross members are reinforced by tubes axially disposed therein.

Another object of the invention is the construction of a hand truck having angular reinforcing tubes disposed within the longitudinal and transverse truck members to afford a strong truck of comparatively light construction.

It is furthermore an object of this invention to provide a light hand truck wherein the tubular members comprising the truck frame are reinforced by angular tubes axially disposed therein and adapted to prevent upward, downward or sidewise bending of the frame members.

It is an important object of the invention to provide a hand truck of simple and comparatively light construction wherein the longitudinal and transverse frame members are welded to one another and are reinforced by inner tubes.

Another important object of the invention is the construction of a light weight hand truck wherein the frame sills and cross-pieces are welded together and reinforced by means of axially disposed members, and wherein the supporting legs or stirrups and the wheel brackets are welded to said frame sills and cross-pieces to obviate the use of bolts and prevent weakening of the frame sills by drilling the same.

Other and further important objects of this invention will be apparent from the disclosures in the specification and drawings.

The invention (in the preferred form) is illustrated in the drawings and hereinafter more fully described.

On the drawings:—

Figure 1 is a side elevation of a truck embodying the principles of this invention.

Fig. 2 is a top plan view thereof with parts broken away to show the sill construction.

Fig. 3 is an enlarged section taken on line 3—3, of Fig. 2, with parts shown in elevation.

Fig. 4 is an enlarged sectional view taken on line 4—4, of Fig. 2, with parts in elevation.

Fig. 5 is an enlarged fragmentary detail section on line 5—5, of Fig. 2 with parts in elevation.

Fig. 6 is an enlarged fragmentary detail section taken on line 6—6, of Fig. 2 with parts in elevation.

Fig. 7 is an enlarged fragmentary detail section taken on line 7—7, of Fig. 2.

Fig. 8 is an enlarged fragmentary detail section taken on line 8—8, of Fig. 2.

Fig. 9 is an enlarged fragmentary detail section on line 9—9, of Fig. 4.

Fig. 10 is a sectional view taken on line 10—10, of Fig. 9.

As shown on the drawings:—

The hand truck embraces a frame comprising longitudinal tubes or tubular sills 1, which are parallel and rigidly held spaced from one another by means of transverse tubes or tubular cross-pieces 2, welded at their ends to said tubular sills 1, to afford a substantially unitary frame construction. The rear ends of the sills 1, are swaged or bent downwardly to form handles 3. The front ends of the sills are open and have frictionally and removably engaged therein a nose consisting of a cross-rail or nosepiece 4, each end of which has integrally formed thereon a passaged shank 5, the end of which is provided with a tapered opening or passage 6, and is longitudinally slotted to form a plurality of curved segment shaped prongs or friction wedge members 7. A screw bolt 8, projects through each of the passaged shanks 5, and threads into a tapered wedge nut 9, which when drawn into the tapered opening 6, forces the wedge prongs outwardly into a tight frictional or wedging engagement with the inner surface of the outer ends of the frame sills 1, as clearly shown in Fig. 9, thus removably holding the truck nose in position.

As shown in Figs. 3 and 4, the central portion of each of the transverse tubes 2, is slightly dished. A squared tube or angular reinforcing member 10, is axially disposed within each of the sills 1, and the transverse tubes 2, to reinforce the same and resist upward, downward and sidewise bending of the truck frame members.

Wheel axle brackets 11, form a part of the truck, and have integrally formed or rigidly secured thereon relatively long concave troughs or seats 12, which receive the front ends of the sills 1, seated therein. The concave troughs 12, are welded to the sills 1, thus obviating the use of bolts and drilling of said sills. Integrally formed on the lower portions of the brackets 11, are bearing members 13, for supporting an axle 14, on which are mounted running wheels 15.

Welded to each of the frame sills 1, to the inside of the handles 3, is a leg, supporting rest or stirrup 16. The legs 16, are braced and connected to one another and to one of the transverse tubes 2, by means of a transverse brace 17, the ends of which are welded to said legs, while the central portion is welded to the rear transverse tube 2.

Flat metal straps or bars 18, are disposed upon the transverse tubes 2, parallel to the frame sills 1, and are rigidly secured in position by means of bolts or rivets 19, which project through the straps and through the transverse tubes 2, and the reinforcing members 10, thereof. The straps 18, serve to support smaller articles upon the truck and prevent the same from falling through the frame, as well as serving as a tie between the transverse tubes to increase the rigidity of the truck frame.

From the construction of the truck as described it will be seen that the truck frame comprises few parts, and inasmuch as the sills, the transverse tubes, the axle brackets, the legs and the brace bracket are all welded together, the truck frame is substantially a one piece or a unitary construction. When a load is positioned upon the truck or a force is exerted or applied to the frame sills and transverse tubes, said sills and tubes are held or braced against bending by the squared or angular reinforcing tubes 10, the edges of which contact the inner surfaces of said sills and tubes. This construction permits the use of frame members of great strength and relatively light weight. As shown in Fig. 9, the truck nose is adapted to be readily removed from the truck frame by removal of the bolts 8, thus permitting the use of different types of truck noses.

I am aware that numerous details of construction may be varied through a wide range without departing from the principles of this invention, and I therefore do not purpose limiting the patent granted otherwise than necessitated by the prior art.

I claim as my invention:

1. A truck frame embracing tubular sills, tubular cross-pieces rigidly connecting said sills together, and angular tubes disposed within said sills and cross-pieces to reinforce the same, said angular tubes having the longitudinal edges thereof disposed parallel to the axes of said sills and cross-pieces.

2. A truck frame embracing sills, cylindrical tubes rigidly connecting said sills together, and prismatic tubes disposed within said sills and tubes to reinforce the same.

3. A truck frame including tubular sills, cylindrical cross-tubes jointed at their ends to the respective sills and rigidly connecting said sills together, prismatic tubes within said sills and cross tubes to reinforce the same, each of the prismatic tubes within a cross tube being joined at its ends to the respective sills.

In testimony whereof I have hereunto subscribed my name in the presence of two subscribing witnesses.

GUILFORD S. WOOD.

Witnesses:
 LAWRENCE REIBSTEIN,
 FRANK A. BREMER, Jr.